United States Patent
Johnson et al.

(10) Patent No.: US 12,246,345 B2
(45) Date of Patent: Mar. 11, 2025

(54) METHOD OF FORMING A COATING ON A SUBSTRATE

(71) Applicant: AXALTA COATING SYSTEMS IP CO., LLC, Wilmington, DE (US)

(72) Inventors: Jeffery W. Johnson, Rochester, MI (US); Delson J. Trindade, Wilmington, DE (US); Yongqing Huang, Hockessin, DE (US); Sedef Piril Ertem, Minneapolis, MN (US)

(73) Assignee: AXALTA COATING SYSTEMS IP CO., LLC, Wilmington, DE (US)

( * ) Notice: Subject to any disclaimer, the term of this patent is extended or adjusted under 35 U.S.C. 154(b) by 788 days.

(21) Appl. No.: 16/050,622

(22) Filed: Jul. 31, 2018

(65) Prior Publication Data
US 2020/0038907 A1  Feb. 6, 2020

(51) Int. Cl.
| | | |
|---|---|---|
| *B05D 7/00* | (2006.01) | |
| *B05D 1/00* | (2006.01) | |
| *B05D 7/14* | (2006.01) | |
| *B32B 27/30* | (2006.01) | |
| *B32B 27/36* | (2006.01) | |

(Continued)

(52) U.S. Cl.
CPC ........... *B05D 7/5723* (2013.01); *B05D 1/007* (2013.01); *B05D 7/14* (2013.01); *B05D 7/532* (2013.01); *B05D 7/577* (2013.01); *B32B 27/30* (2013.01); *B32B 27/36* (2013.01); *C09D 175/06* (2013.01);

(Continued)

(58) Field of Classification Search
CPC ...... B05D 7/5723; B05D 7/532; B05D 1/007; B05D 7/577; B05D 7/14; B05D 2502/005; B05D 1/04; B05D 5/06; B05D 5/061; B05D 5/00; B05D 7/576; B05D 2451/00; B05D 2502/00; B05D 2350/60
See application file for complete search history.

(56) References Cited

U.S. PATENT DOCUMENTS

| | | | | |
|---|---|---|---|---|
| 4,551,401 A | * | 11/1985 | Wilson | H01M 4/20 |
| | | | | 429/126 |
| 6,190,523 B1 | * | 2/2001 | Tazzia | C09D 5/4411 |
| | | | | 523/412 |

(Continued)

FOREIGN PATENT DOCUMENTS

| | | |
|---|---|---|
| CN | 101273068 A | 9/2008 |
| CN | 102099418 A | 6/2011 |

(Continued)

*Primary Examiner* — Francisco W Tschen
(74) *Attorney, Agent, or Firm* — Lorenz & Kopf, LLP

(57) ABSTRACT

A method of forming a multilayer coating on a substrate is provided. The multilayer coating exhibits reduced strike-in and mottling. The method includes the steps of providing the substrate including a primer disposed thereon, applying a basecoat composition on the primer, applying a clearcoat composition on the basecoat composition, and curing the basecoat composition and the clearcoat composition to form the multilayer coating on the substrate. The basecoat composition includes a film forming resin, a pigment, and about 5% to about 75% by weight on binder of a cyclic lactone modified branched acrylic polymer having a hydroxyl monomer content of about 1% to 65% by weight, all or part of which has been reacted with a cyclic lactone, and having a weight average molecular weight (Mw) of about 10,000 to about 150,000 g/mol.

19 Claims, 1 Drawing Sheet

(51) Int. Cl.
*C09D 175/06* (2006.01)
*C08L 61/28* (2006.01)
*C09D 5/36* (2006.01)

(52) U.S. Cl.
CPC ........ *B05D 2502/005* (2013.01); *C08L 61/28* (2013.01); *C09D 5/36* (2013.01)

(56) References Cited

U.S. PATENT DOCUMENTS

| | | | |
|---|---|---|---|
| 7,740,911 B2* | 6/2010 | Hazan | C09D 151/003 427/385.5 |
| 7,867,569 B2 | 1/2011 | Hazan et al. | |
| 2001/0016230 A1* | 8/2001 | Matsuoka | B05D 5/066 427/407.1 |
| 2002/0015795 A1* | 2/2002 | Toui | C09D 143/04 427/407.1 |
| 2002/0122892 A1* | 9/2002 | Dattilo | B05D 7/574 427/240 |
| 2005/0084628 A1* | 4/2005 | Williams | B05D 1/322 427/372.2 |
| 2005/0256260 A1* | 11/2005 | Ohrbom | C08G 18/6254 524/589 |
| 2006/0188738 A1* | 8/2006 | Jennings | C09D 167/00 428/480 |
| 2007/0082211 A1 | 4/2007 | Hazan et al. | |
| 2007/0142591 A1* | 6/2007 | Johnson | C08F 265/06 526/318.43 |
| 2007/0190311 A1* | 8/2007 | Johnson et al. | C09D 151/003 428/323 |
| 2008/0305270 A1* | 12/2008 | Uhlianuk | C09D 133/06 427/385.5 |
| 2011/0117378 A1* | 5/2011 | Kawaguchi | C08L 67/02 428/480 |
| 2012/0208020 A1* | 8/2012 | Yokoyama | C09D 133/14 428/375 |
| 2014/0186633 A1* | 7/2014 | Henry | G01J 3/463 427/256 |

FOREIGN PATENT DOCUMENTS

| | | |
|---|---|---|
| CN | 104470645 A | 3/2015 |
| JP | 2009511251 A | 3/2009 |

* cited by examiner

METHOD OF FORMING A COATING ON A SUBSTRATE

TECHNICAL FIELD

The present disclosure generally relates to a multilayer coating and a method of forming the same. More specifically, the multilayer coating is formed using a basecoat composition that includes a cyclic lactone modified branched acrylic polymer which reduces strike-in and mottling of the multilayer coating.

BACKGROUND

Coating systems for automobiles normally include a multiplicity of coatings applied to a steel substrate. Typically, the steel is first treated with a rust-proofing phosphate layer. Subsequently, a cathodic electrocoat primer (also known as an e-coat) for additional corrosion protection is also applied. A primer-surfacer (also known as a chip resistant primer, primer, or primer filler) is subsequently applied to produce a smooth surface for topcoating and also to provide stone chip resistance to the coating system during the normal course of driving. Then a top-coat system is applied, sometimes as a single colored coat, but more often as a basecoat that includes solid color or flake pigments, followed by a transparent protective clearcoat, to protect and preserve the attractive aesthetic qualities of the finish on the vehicle even after prolonged exposure to the environment or weathering.

Application of the basecoat and the clearcoat is normally achieved by wet-on-wet applications. For example, the clearcoat can applied wet onto the wet basecoat without baking the basecoat prior to clearcoat application (although the basecoat may be flash dried for a short period of time at room temperature prior to clearcoat application). Subsequently, the basecoat and the clearcoat can be baked at the same time to form a dried and cured finish. In a conventional method, the underlying primer is baked before being topcoated with basecoat and clearcoat. Historically, baked primers have been used not only to provide a smooth surface on which to apply the topcoat, but also to also prevent interfacial bleeding or intermixing with the overlying basecoat and avoid disrupting the appearance of the overall finish. Resistance to intermixing is especially important for the appearance of glamour metallic finishes which are popular on automobiles and trucks. Any disturbance of metallic pigment flake orientation in metallic basecoats after application will detract from the metallic effect of the finish. Therefore, care must be taken to ensure that the metal pigment flakes are not disturbed after painting.

Typically, in wet-on-wet applications of the basecoat and clearcoat, the basecoat includes CABs (cellulose acetate butyrates) dissolved therein for fast flash drying of the basecoat before clearcoats, such as 2K clearcoats, are applied. However, many 2K clearcoats, especially polar clearcoats such as isocyanate based clearcoats, tend to redissolve basecoat binder resins including the CABs at the interface of the basecoat and the clearcoat. This causes disruption of the metal pigment flakes in the basecoat leading to strike-in, mottling, and general disruption of color and finish, all of which are undesirable.

Therefore, there remains an opportunity to develop a more effective way to minimize strike-in, mottling, and disruption of the metal pigment flakes in the basecoat.

The instant disclosure addresses these problems and provides solutions. Additional beneficial features and characteristics of various multilayer coatings will become apparent from the subsequent detailed description and examples.

SUMMARY OF THE DISCLOSURE

This disclosure provides a method of forming a multilayer coating on a substrate. The multilayer coating exhibits reduced strike-in and mottling. The method includes the steps of providing the substrate including a primer disposed thereon, applying a basecoat composition on the primer, applying a clearcoat composition on the basecoat composition, and curing the basecoat composition and the clearcoat composition to form the multilayer coating on the substrate. The basecoat composition includes a film forming resin, a pigment, and about 5% to about 75% by weight on binder of a cyclic lactone modified branched acrylic polymer having a hydroxyl monomer content of about 1% to 65% by weight, all or part of which has been reacted with a cyclic lactone, and having a weight average molecular weight (Mw) of about 10,000 to about 150,000 g/mol. The multilayer coating exhibits mottling of less than about 4 measured at 15 degrees from specular reflection. Furthermore, the primer is free of the cyclic lactone modified branched acrylic polymer while the primer, the basecoat composition, and the clearcoat composition are each free of a cyclic lactone modified linear acrylic polymer.

This disclosure also provides an article that includes a substrate, an electrodeposition coated film disposed on the substrate, and the multilayer coating disposed on the substrate. The multilayer coating includes the primer, a basecoat disposed on the primer, and a clearcoat disposed on the basecoat. The basecoat is formed from the aforementioned basecoat composition.

The disclosure further provides the multilayer coating itself which includes a primer, a basecoat disposed on the primer and formed from the aforementioned basecoat composition, and a clearcoat disposed on the basecoat.

BRIEF DESCRIPTION OF THE DRAWINGS

The present disclosure will hereinafter be described in conjunction with the following drawing figures, wherein like numerals denote like elements, wherein.

DETAILED DESCRIPTION

The following detailed description is merely exemplary in nature and is not intended to limit the disclosure. Furthermore, there is no intention to be bound by any theory presented in the preceding background or the following detailed description.

Embodiments of the present disclosure are generally directed to multilayer coatings and methods for forming the same. For the sake of brevity, some conventional techniques related to formation of multilayer costings and use thereof may not be described in detail herein. Moreover, the various tasks and process steps described herein may be incorporated into a more comprehensive procedure or process having additional steps or functionality not described in detail herein. In particular, various steps in the manufacture and use of multilayer coatings are well-known and so, in the interest of brevity, many conventional steps will only be mentioned briefly herein or will be omitted entirely without providing the well-known process details.

Figure 1:
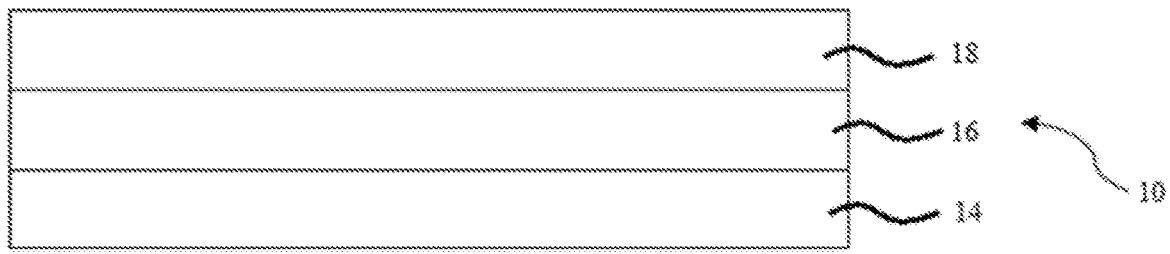
FIG. 1 is a side cross-sectional view of a multi-layer coating including a primer, a basecoat disposed on and in direct contact with the primer, and a clearcoat disposed on and in direct contact with the basecoat, thereby sandwiching the basecoat between the primer and the clearcoat.

This disclosure provides a multilayer coating 10 and a method of forming the multilayer coating 10 on a substrate 12, e.g. as shown in FIG. 1. The multilayer coating 10 exhibits reduced strike-in and mottling. Strike-in is typically described as a coating defect wherein the basecoat has a dull or blurry appearance of due to migration of binder in wet on wet applications. For example, strike-in measurements are measurements of disruption of pigment caused by a clearcoat striking aluminum/mica flakes in the basecoat thereby changing their orientation. Once their orientation changes, the light reflected therefrom changes which, in turn, changes appearance of the coating to the naked eye. Typically, this measurement is completed by spraying a basecoat composition on 2 panels at same time side by side. One of the two panels is then baked until cure is complete and/or the basecoat is dry. The other is left wet. Subsequently, a clearcoat composition is applied to both the wet basecoat and the cured/dry basecoat. The clearcoat composition is then cured. Curing of the clearcoat composition may also cure the wet basecoat. Measurement of Ln on the panels is indicative of strike-in. The panel that includes the basecoat composition that was cured before application of the clearcoat composition typically exhibits better Ln values since the aluminum/mica flakes will not have moved when clearcoat composition was applied. The converse is true for the panel that included the wet basecoat composition.

The multilayer coating 10 itself typically includes a primer 14, a basecoat 16 which is disposed on the primer 14, and a clearcoat 18 disposed on the basecoat 16, as also shown in FIG. 1. However, it is also contemplated that the multilayer coating 10 may include only the basecoat 16 and the clearcoat 18 if the primer 14 is already present in a substrate 12, such as in a refinish application. For example, in such an embodiment, the multilayer coating 10 would not include the primer 14.

Figure 3:
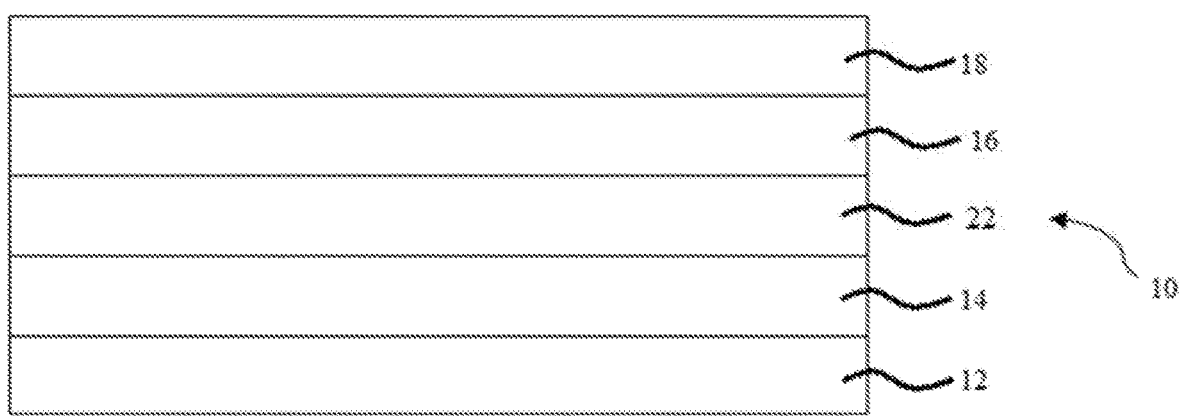
FIG. 3 is a side cross-sectional view of a multi-layer coating including a primer, a sealer disposed on and in direct contact with the primer, a basecoat disposed on and in direct contact with the sealer, and a clearcoat disposed on and in direct contact with the basecoat, thereby sandwiching the basecoat between the sealer and the clearcoat.

As shown in FIG. 3, it is also contemplated that the multilayer coating 10 itself may include a sealer 22. The sealer 22 is typically disposed between the primer 14 and the basecoat 16. For example, the primer 14 and the basecoat 16 may sandwich the sealer 22 therebetween such that there is no additional layer disposed between the primer 14 and the sealer 22 or between the sealer 22 and the basecoat 16. The sealer may be any known in the art. In one embodiment, the multi-layer coating 10 includes the primer 14, the sealer 22 disposed on and in direct contact with the primer 14, the basecoat 16 disposed on and in direct contact with the sealer 22, and the clearcoat 18 disposed on and in direct contact with the basecoat 16, thereby sandwiching the basecoat 16 between the sealer 22 and the clearcoat 18.

Mottling is typically described as an undesirable defect which can occur with coatings such that it is most obvious on light metallic finishes. If mottling is present, the total color impression shows irregular areas of lightness variations. These "patches" are usually visually evaluated, described as a mottling effect. This effect is especially noticeable on large body panels. Mottling can be caused by coating compositions as well as variations in a method of application. For example, disorientation of the metallic flakes or film thickness variations of a basecoat can lead to various mottle sizes resulting in a non-uniform appearance. The visual perception of mottling is dependent on the viewing distance. Large mottles can be seen in far distance evaluation, while small mottles are more noticeable in close up evaluation. The visual evaluation of mottling is subjective, as it depends on the illumination conditions, the observing distance and the viewing angle. To objectively evaluate mottling, lightness variations over a large sample area and under different detection angles can be measured. For example, a cloud-runner machine can be used to optically scan a surface and measures lightness variations. A specimen is illuminated with a white light LED at a 15° angle and lightness is detected under three viewing angles to simulate visual evaluation under different observing conditions: 15°, 45° and 60° measured from specular reflection. A mottling meter is rolled across the surface for a defined distance of 10 to 100 cm and measures lightness variations point by point. A measurement signal is divided via mathematical filter functions into six different size ranges and a rating value is calculated for each angle and mottle size. The higher the value is, the more visible the mottling effect. The measured values are displayed in a graph showing the mottle size on the X-axis and the rating value on the Y-axis. Thus, target values for small and large mottle sizes can be established for paint batch approval as well as process control.

For example, in automotive colors, some bright silver metallic colors have very high lightness values at near spec angle (Ln). For example, Ln is larger than 140. Ln is measured by an Acquire EFX Spectrometer from Axalta Coating Systems. These colors typically require excellent control of aluminum flakes in a basecoat and minimum strike-in from applying a clearcoat disposed on the top of the basecoat, each described in detail below. In various embodiments, a basecoat with relatively higher volume solid (such as larger than 13 vol %) is desired since such a basecoat requires less coats to achieve hiding than lower volume solid coatings. However, it is difficult to achieve higher lightness values at near spec angle Ln due to a smaller volume shrinkage during drying of a basecoat compared to a layer with a lower volume solid. Besides color, it is also typically desirable to provide a smooth and uniform appearance of a coating. In general, adding a flexible resin, such as a polyester resin, helps to improve smoothness but tends to increase strike-in after application of the clearcoat. For example, a finished bright silver coating usually shows dark areas and mottling if there is increased strike-in from applying a clearcoat. Using a cyclic lactone modified branched acrylic polymer of this disclosure can provide a smoother film while reducing strike-in impact from a clearcoat.

Strike-in values tend to be system dependent. However, in various embodiments, the strike-in of the multilayer coating 10 is less than about 5.5 measured as a difference in Ln. In other embodiments, the strike-in of the multilayer coating is less than about 5, 4.5, 4, 3.5, 3, 2.5, 2, 1.5, 1, or 0.5, measured as a difference in Ln values. Differences in Ln values both before and after applying a clearcoat are typically used to determine strike-in property. The smaller the differences between the before and after values, the better the anti-strike-in is determined to be. Moreover, in various non-limiting embodiments, all values and ranges of values including and between those set forth above are expressly contemplated for use herein.

In other embodiments, the multilayer coating 10 exhibits a mottling of less than about 4, 3.9, 3.8, 3.7, 3.6, 3.5, 3.4, 3.3, 3.2, 3.1, or 3, measured at 15 degrees from specular reflection (i.e., at M15). In other embodiments, the multilayer coating 10 exhibits a mottling of less than about 4, 3.9, 3.8, 3.7, 3.6, 3.5, 3.4, 3.3, 3.2, 3.1, or 3, measured at 45 and/or 60 degrees from specular reflection (i.e., at M45 or M60, respectively). M15, M45 and M60 are mottling values measured at 15, 45 and 60 degrees from specular reflection, respectively, by a Cloud-runner (BYK-Gardner GmbH Co.). These values are typically used to determine the mottling. Moreover, in various non-limiting embodiments, all values and ranges of values including and between those set forth above are expressly contemplated for use herein.

In still other embodiments, the multilayer coating 10 exhibits a smoothness of less than about 14, 13.5, 13, 12.5, 12, 11.5, 11, etc. as determined using shortwave measured by a Wave Scan (BYK-Gardner GmbH Co.). Smoothness (i.e., a smooth appearance) is one of the most important attributes in the automotive industry. For example, in refinish applications, the smoothness must match the appearance of OEM product. The lower the value the better the smoothness. Typically, smoothness reflects the impact of the basecoat 16 on the finished smoothness. The smoother the basecoat 16 the smaller the smoothness value typically is.

Moreover, in various non-limiting embodiments, all values and ranges of values including and between those set forth above are expressly contemplated for use herein.

The primer 14 may be referred to as a primer layer, while the basecoat 16 may be referred to as a basecoat layer. Similarly, the clearcoat 18 may be referred to as a clearcoat layer. Any one or more of the layers 14, 16, 18 may be disposed on and in direct contact with another layer or disposed on and separated from another layer. For example, and as set forth in FIG. 1, the basecoat 16 may be disposed on and in direct contact with the primer 14 such that there is no layer disposed between them. As also set forth in FIG. 1, the clearcoat 18 may be disposed on and in direct contact with the basecoat 16 such that there is no layer disposed between them. In still another embodiment, the basecoat 16 is disposed on and in direct contact with the primer 14 while the clearcoat 18 is disposed on and in direct contact with the basecoat 16 such that the primer 14 and the clearcoat 18 sandwich the basecoat 16 therebetween in a three-layer sandwich. Again, this is shown in FIG. 1. Alternatively, the multilayer coating 10 may be disposed directly on a substrate 12 or disposed on and spaced apart from the substrate, e.g. as shown in FIG. 2.

The substrate 12 may be any known in the art such as metal, plastic, wood, glass, foamed bodies, and combinations thereof. One example of such a metal substrate 12 is an automobile component such as a body panel, roof panel, etc. Non-limiting examples of metal substrates 12 include iron, copper, aluminum, tin, zinc and the like and alloys containing these metals, such as steel. Specific products include bodies and parts of automobiles such as passenger cars, trucks, motorcycles and buses. In various embodiments, the metal substrate 12 is one which is preliminarily subject to forming treatment with phosphate salt, chromate salt or the like. Examples of plastic substrates 12 include polyester reinforced fiberglass, reaction-injection molded urethanes, partially crystalline polyamides, and the like or mixtures thereof, which may be primed or unprimed or otherwise treated prior to use. These plastic substrates 12 are oftentimes used in fabricating specific automotive body parts, such as fenders, bumpers, and/or trim parts.

Figure 2:
FIG. 2 is a side cross-sectional view of an article that includes a substrate including an electrodeposition coated film disposed thereon, a primer disposed on the substrate, a basecoat disposed on the primer, and a clearcoat disposed on the basecoat.

In other embodiments, such as shown in FIG. 2, the substrate 12 may have an electrodeposition coated film 20 disposed on a surface of the substrate 12 which is subjected to forming treatment. In such an embodiment, the primer 14 is disposed on the substrate 12 but not in direct contact therewith because the electrodeposition coated film 20 is disposed therebetween, i.e., between the substrate 12 and the primer 14. In other words, in such an embodiment, the primer 14 is disposed on and spaced apart from the substrate 12 while the electrodeposition coated film 20 is disposed on and in direct contact with the substrate 12. Moreover, in such an embodiment, the primer 14 is disposed on and in direct contact with the electrodeposition coated film 20. Furthermore, in this embodiment, the primer 14 and the substrate 12 sandwich the electrodeposition coated film 20 therebetween to form a three-layer sandwich. Similarly, the basecoat 16 and the clearcoat 18 may be utilized in this embodiment in the same was as is described above. The electrodeposition coated film 20 may be formed from an anionic or a cationic electrodeposition coating composition. However, a cationic electrodeposition coating composition is typically utilized since it provides excellent corrosion resistance.

The multilayered coating 10 typically has a total film build thickness of about 3 to about 5 mils, e.g. about 3 to about 4 or about 4 to about 5, mils. Moreover, in various non-limiting embodiments, all values and ranges of values including and between those set forth above are expressly contemplated for use herein. It is important to have an adequate film build in each individual layer because a low film build tends to affect the appearance, mechanical properties, and the amount of UV transmittance, of the multilayered coating 10. Film builds that are too low can allow UV radiation to penetrate to the electrodeposition coated film 20 which typically does not include UV absorbers.

Referring back to the primer 14, the primer 14 typically has a thickness of from about 1 to about 4 mils, e.g. about 1, 2, 3, or 4, mils. Moreover, in various non-limiting embodiments, all values and ranges of values including and between those set forth above are expressly contemplated for use herein.

The primer 14 is typically formed using a primer composition, which may be any known in the art. The primer composition may be water-borne or solvent-borne and may be a single part or multi-part composition. In various embodiments, the primer composition can be formulated to have a low VOC content, can be formulated into a gray or colored composition that is easy to hide, forms finishes that are hard but still flexible, has excellent adhesion to a variety of substrates such as cold rolled steel, phosphatized steel, phosphatized steel primed with an electrocoat primer applied by electrocoating, plastic substrates which may be preprimed or unprimed such as polyester reinforced fiber glass, reaction injection molded urethanes, partially crystalline polyamides and other plastic substrates and provides a surface to which conventional topcoats will adhere. In other embodiments, the primer composition can be used as a surfacer or filler to cover imperfections in the substrate 12. For example, electrocoating of metal substrates often results in a finish that has small imperfections and the primer composition can be applied to form a smooth finish that is free from imperfections. Also, plastic substrates such as SMC (sheet molding compound), which include polyesters reinforced with fiber glass, have many surface imperfections and can be coated with a primer composition.

In one embodiment, the primer composition includes a film forming binder and a volatile organic liquid carrier, which usually is a solvent for the film forming binder. In one embodiment, it is desired that the primer composition be formulated as a low VOC composition. Accordingly, for low VOC compositions, the primer composition typically has a film forming binder content of about 40% to about 85% by weight and correspondingly about 15% to about 60% by weight of volatile organic liquid carrier based on a total weight of the primer composition. Generally, the primer composition also includes pigments in a pigment to binder weight ratio of about 1:100 to about 150:100.

A film-forming portion of the primer composition can be described as a "binder" or "binder solids". The binder generally includes all the film-forming components that contribute to a solid organic portion of the cured primer composition, i.e., the primer 14. Generally, catalysts, pigments, and non-polymeric chemical additives such as stabilizers described hereinafter are not considered part of the binder solids. Non-binder solids other than pigments typically do not amount to more than about 5-15% by weight of the primer composition.

In various embodiments, the primer composition may also include, e.g. as part of a film-forming binder, a crosslinking agent. The crosslinking agent may be an aminoplast resin or blocked polyisocyanate resin or mixture of the two. In general, aminoplast resins are aldehyde condensation products of melamine, urea, benzoguanamine, or a similar compound. Typically, the aldehyde employed is formaldehyde, although suitable products can be made from other aldehydes, such as acetaldehyde, crotonaldehyde, acrolein, benzaldehyde, furfural, and others. Condensation products of melamine or urea are the most common. However, products of other amines and amides in which at least one amine group is present can also be employed.

Of the melamine condensates, monomeric or polymeric melamine formaldehyde condensate resins that are partially or fully alkylated can be used. These resins are organic solvent-soluble and are commercially available under the tradename Cymel from Cytec Industries, Inc., West Patterson, N.J. One typical crosslinking agent is a methylated and butylated or isobutylated melamine formaldehyde resin that has a degree of polymerization of about 1-3. Generally, this melamine formaldehyde resin includes about 50% butylated groups or isobutylated groups and 50% methylated groups. Another typical melamine is a fully butylated resin known as Cymel 1156. Other possible crosslinking agents can also be used, such as urea formaldehyde, benzoquanamine formaldehyde and blocked or unblocked polyisocyanates or compatible mixtures of any of the forgoing crosslinkers.

In other embodiments, the aminoplast crosslinking agent(s) described above can be substituted for or optionally combined with any of conventional blocked polyisocyanate crosslinking agents for enhanced coating properties. Typical blocking agents are alcohols, ketimines, oximes, pyrazoles and the like.

Typical examples of polyisocyanates are isocyanate compounds having 2 to 4 isocyanate groups per molecule, such as 1,6-hexamethylene diisocyanate, isophorone diisocyanate, 2,4-toluene diisocyanate, diphenylmethane-4,4'-diisocyanate, dicyclohexylmethane-4,4'-diisocyanate, tetramethylxylidene diisocyanate, and the like. Polyisocyanates having isocyanurate structural units can also be used such as the isocyanurate of hexamethylene diisocyanate which is available under the tradename Desmodur N-3390 from Bayer Corporation, the isocyanurate of isophorone diisocyanate (isocyanurate) which is available under the tradename Desmodur Z-4470 from Bayer Corporation and the like.

Polyisocyanate functional adducts can also be used that are formed from any of the forgoing organic polyisocyanate and a polyol. Polyols such as trimethylol alkanes like trimethylol propane or ethane can be used. One suitable adduct is the reaction product of tetramethylxylidene diisocyanate and trimtheylol propane and is available under the tradename of Cythane 3160. When the crosslinkable resin of the present invention is used in exterior coatings, the use of an aliphatic or cycloaliphatic isocyanate is preferable to the use of an aromatic isocyanate, from the viewpoint of weatherability and yellowing resistance. An example of a suitable blocked isocyanate that can be used in the present system is a pyrazole blocked polyisocyanate of 1,6-hexamethylene diisocyanate which is available from Bayer Corporation.

Optionally, in addition to the above film-forming binder constituents, the primer composition may also include, as part of the film-forming binder, other film-forming binder resins and/or crosslinking resins, such as acrylic resins, acrylourethane resins, alkyd resins, epoxy resins, polyester resins, polyester urethane resins, and the like.

In still other embodiments, and besides the film-forming binder constituents, the primer composition of can include minor amounts of non-binder solids. Generally, catalysts, pigments, or chemical additives such as stabilizers are not considered part of the binder solids. Non-binder solids other than pigments typically do not amount for more than about 5-15% by weight of the primer composition. Such additional additives will depend on the intended use of the primer composition.

In various embodiments, to increase the rate of crosslinking of the primer composition on curing, a catalyst can be added to the primer composition. Generally, about 0.1% to about 6% by weight of the catalyst is used, based on the weight of the binder. Typical catalysts are blocked acid catalysts. Typically suitable blocked acid catalysts are aromatic sulfonic acids blocked with amino methyl propanol or dimethyl oxazoline. Typically suitable aromatic sulfonic acids are para toluene sulfonic acid, dodecyl benzene sulfonic acid, decyl benzene sulfonic acid. One typical catalyst is dodecyl benzene sulfonic acid blocked with amino methyl propanol.

To improve outdoor weatherability of the primer composition and protect the multilayer coating 10 from premature degradation, the primer composition typically includes about 0.01% to about 2% by weight of ultraviolet light stabilizers, based on the weight of the binder, such as ultraviolet light absorbers, screeners and quenchers. Typical ultraviolet light stabilizers include benzophenones, triazines, triazols, benzoates, hindered amines and blends of thereof.

Typical pigments that can be used in the primer composition are filler pigments such as talc, china clay, barytes, carbonates, silicates, and color pigment such as metallic oxides such as titanium dioxide, zinc oxide and iron oxide and carbon black and organic colored pigments and dyes. In various embodiments, the resulting primer composition has a pigment to binder weight ratio of about 1:100 to about 150:100.

The pigments can be introduced into the primer composition by first forming a mill base with an acrylic copolymer dispersant or with another compatible polymer or dispersant by conventional techniques such as sand grinding, ball milling or attritor grinding. The mill base can be blended with other constituents used in the primer composition.

In some embodiments, a gray color primer composition prepared by using carbon black and titanium dioxide is employed. However, various color pigments may be employed to provide various colors, e.g. colors having a hue similar to that of the basecoat composition that is subsequently applied thereover. This may be done to enable a colored basecoat composition to achieve hiding at low film builds. In addition, it is generally desirable to include small amounts of talc in the primer composition to improve the chipping resistance of the multilayer coating.

Referring now to a liquid carrier, any conventional organic solvent or blends of solvents can be used to form the primer composition provided that the selection of solvents is such that the components are compatible and form a high quality primer 14 after curing. The following are non-limiting examples of solvents that can be used to prepare the primer composition: methyl ethyl ketone, methyl amyl ketone, methyl isobutyl ketone, toluene, xylene, acetone, ethylene glycol monobutyl ether acetate and other esters, ethers, ketones and aliphatic and aromatic hydrocarbon solvents that are conventionally used. The solvents primarily serve as the volatile vehicle to convey the solid material to the substrate 12 to be coated. The solvent is preferably employed in an amount to provide a stable concentrate that can be shipped to assembly plants which is later reduced with solvent to a suitable spray viscosity for ease of application.

In addition to the above ingredients, the primer composition may also include other formulation additives such as toughening agents, and flow control agents, for example, such as Resiflow S (polybutylacrylate), BYK 320 and 325 (high molecular weight polyacrylates). Such additional additives can be chosen based on the desired final properties of the primer composition. In addition, conventional rheologically active agents, such as Garamite clay, fumed silica, urea sag control agents, and the like can also be used, for enhanced intermixing resistance.

In various embodiments, high solids primer compositions can be used in the multilayer coating 10. The primer coating composition can have a total solids content (% non-volatile) of about 40% to about 70% by weight at the time of application, and typically from about 50% to about 65% by weight, based on the total weight of the coating composition in order to keep air pollution to a minimum level. High solids coatings behave like low solids liquid coatings but have the additional benefit of lower solvent content and significantly reduced emissions. The volatile organic content or VOC level at such solids typically translates to less than about 3.5 pounds of organic solvent per gallon of the primer composition, as determined under the procedure provided in ASTM D3960. Additional solvent may be added, if necessary, at the time of application to adjust the spray viscosity and control the flow and leveling of the primer composition and provide other desirable properties. The primer composition can be applied to a plastic or metal substrate 12 by conventional techniques such as spraying, electrostatic spraying, dipping, brushing, flowcoating and the like.

Basecoat Composition:

Referring now to the basecoat composition, this composition is used and cured to form the basecoat 16. The basecoat 16 typically forms a top coated film, e.g. an outermost layer, together with the clearcoat 18, which is described in detail below. The basecoat composition includes a film forming resin and a pigment, each described in detail below. The basecoat composition may be free of a curing agent or may include a curing agent. The curing agent, if used, can be any known in the art. For example, the curing agent may be a melamine or an isocyanate. In addition, the basecoat composition includes a cyclic lactone modified branched acrylic polymer, also described in detail below. The basecoat 16 typically has a thickness of from about 0.3 to about 2 mils, e.g. about 0.5 to 1.5, about 1 to about 1.5, about 0.5 to about 1, etc., mils. Moreover, in various non-limiting embodiments, all values and ranges of values including and between those set forth above are expressly contemplated for use herein.

Relative to the film forming resin, any known in the art can be used. Non-limiting examples of suitable resins include, but are not limited to, polyester resins, acrylic resins, alkyd resins, epoxy resins, urethane resins and the like. Moreover, such resins may be employed alone or in combination. Any of the aforementioned film forming resins may alternatively be used.

In various embodiments, the film forming resin can include one or more polyester resins such as linear or branched polyesters. In other embodiments, the film forming resin can include one or more acrylic resins, which may be any known in the art.

The basecoat composition may be colored or not colored. That said, and relative to the pigment, any pigment in the art may be used. Typical pigments that can be used in the basecoat composition are filler pigments such as talc, china clay, barytes, carbonates, silicates, and color pigment such as metallic oxides such as titanium dioxide, zinc oxide and iron oxide and carbon black and organic colored pigments and dyes. Moreover, the basecoat composition may include an optional effect pigment, to impart a special visual effect such as sparkle, pearlescent, luminescent, and/or metallic appearance or an increased depth of color to the basecoat composition. The basecoat composition may be a solvent type or a water-borne type. For example, if water-borne, the basecoat may include from about 50 to about 99, about 55 to about 95, about 60 to about 90, about 65 to about 85, about 70 to about 80, or about 75 to about 80, weight percent of water, based on a total weight of the basecoat composition.

Cyclic Lactone Modified Branched Acrylic Polymer

Referring now to the cyclic lactone modified branched acrylic polymer, this polymer has a hydroxyl monomer content of about 1% to about 65% by weight, all or part of which has been reacted with a cyclic lactone. This polymer also has a weight average molecular weight (Mw) of about 10,000 to about 150,000 g/mol. Each is described in detail below.

It is to be appreciated that the hydroxyl monomer content typically refers to the amount of hydroxyl monomers that were available in the reaction mixture to form the cyclic lactone modified branched acrylic polymer by weight on the total amount of monomers contained within the reaction mixture. As well known to the skilled artisan, monomers that have been reacted to form a polymer are no longer monomers, per se, but are referred to in the context of monomer content for clarity.

In various embodiments, the cyclic lactone modified branched acrylic polymer is included in the basecoat composition in an amount of from about 5% to about 75% by weight on binder. In other embodiments, this amount is from about 5 to about 70, about 5 to about 65, about 5 to about 60, about 5 to about 55, about 5 to about 50, about 10 to about 45, about 15 to about 40, about 20 to about 35, about 25 to about 30, about 30 to about 35, about 20 to about 30, about 15 to about 25, about 12.5 to about 25, about 12.5 to about 15, about 12.5 to about 17.5, etc. %, on binder. A film-forming portion of the base coating composition can be described as a "binder" or "binder solids". The binder generally includes all the film-forming components that contribute to a solid organic portion of the cured basecoat composition. Generally, catalysts, pigments, and non-polymeric chemical additives such as stabilizers described hereinafter are not considered part of the binder solids. Therefore, the terminology "on binder" describes everything that is in the basecoat composition that isn't a pigment, additive, solvent, etc. as is described above. In other words, about 5% to about 75% of the dry portions of the basecoat composition can be the cyclic lactone modified branched acrylic polymer. In additional non-limiting embodiments, all values and ranges of values including and between those above are hereby expressly contemplated for use herein.

The cyclic lactone modified branched acrylic polymer may be a polyester-extended acrylic polymer that has been extended with caprolactone such as epsilon-caprolactone. Polyester chain extension may occur at a chain end or it may at any other point along an acrylic backbone that forms during polymerization. Any cyclic lactone known in the art can be used instead of caprolactone. In one embodiment, the polymer is described as a cyclic caprolactone modified branched acrylic polymer or a caprolactone modified branched acrylic polymer. Other cyclic lactones that can be used are delta-valerolactone and gamma-butyrolactone.

Moreover, the cyclic lactone modified branched acrylic polymer may be substantially non-gelled or non-gelled. These terms refer to reaction products that are substantially free of crosslinking and that have a measurable intrinsic viscosity when dissolved in a suitable solvent for the cyclic lactone modified branched acrylic polymer. As is well known in the art, the intrinsic viscosity of a polymer is determined by plotting the reduced viscosity versus the concentration and extrapolating to zero concentration. A gelled reaction product is essentially of infinite molecular weight and will often have an intrinsic viscosity that is too high to measure.

In various embodiments, the cyclic lactone modified branched acrylic polymer is a substantially non-gelled, cyclic lactone modified branched acrylic polymer, which is sometimes referred to as "highly branched" or "hyper branched" or "branched" acrylic polymer." In some embodiments, the substantially non-gelled cyclic lactone modified branched acrylic polymer has a Mw (weight average molecular weight) of about 10,000 to about 150,000 g/mol. In various embodiments, the weight average molecular weight is from about 20,000 to about 140,000, about 30,000 to about 130,000, about 30,000 to about 120,000, about 40,000 to about 110,000, about 50,000 to about 100,000, about 60,000 to about 90,000, about 70,000 to about 80,000, g/mol. All molecular weights described herein are determined by gel permeation chromatography using polystyrene as the standard. It is also contemplated that in various non-limiting embodiments, all values and ranges of values including and between those set forth above are expressly contemplated for use herein.

In addition, the cyclic lactone modified branched acrylic polymer has a hydroxyl monomer content to allow the polymer to be chain extended and have the desired crosslinking functionality, high molecular weight and intermixing or strike-in resistance but still sufficiently low viscosity. This content may be about 1 to about 65% by weight. Moreover, a number of moles of caprolactone per mole to hydroxyl in the mixture being polymerized is typically of from about 0.25 to about 6, from about 0.75 to about 3, or about 2. In one embodiment, the cyclic lactone modified branched acrylic polymer is free of or essentially free of carboxyl functional groups. In various embodiments, the cyclic lactone modified branched acrylic polymer has a hydroxyl monomer content of from about 5 to about 40, about 10 to about 35, about 15 to about 30, about 20 to about 25, or about 10 to about 20, %. Moreover, in various non-limiting embodiments, all values and ranges of values including and between those set forth above are expressly contemplated for use herein.

In various non-limiting embodiments, the inclusion of the cyclic lactone modified branched acrylic polymer may not may not prevent intermixing of the wet basecoat composition and the wet clearcoat composition. In various embodiments, the cyclic lactone modified branched acrylic polymer is typically formed from, or is, the reaction product of caprolactone and at least two types of ethylenically unsaturated monomers. These ethylenically unsaturated monomers may include at least one monoacrylic monomer and at least one di(meth)acrylic monomer, i.e., at least one diacrylic or dimethacrylic monomer. Throughout this disclosure, the terminology "(meth)" describes that the "meth" group is optional. For example, a "(meth)" acrylate may be "methacrylate" or "acrylate."

Optionally, the reaction product may include reaction with at least one monomethacrylic monomer, provided that it does not exceed about 30% or about 40% by weight of the total reaction mixture. Higher amounts can be used but at amounts exceeding 40% by weight, such monomers begin to interfere with the branching mechanism and thus result in a polymer of a lower degree of branching, as demonstrated by a sharp rise in viscosity, which is undesirable. The products formed at such concentrations are quite viscous and difficult to handle.

In a typical embodiment, the monomer mixture includes no more than 30% by weight diacrylic and/or dimethacrylic monomers in total, to minimize gel formation under typical reaction conditions. In one embodiment, the cyclic lactone modified branched acrylic polymer is the reaction product of caprolactone, at least one monoacrylic monomer, at least one di(meth)acrylic monomer, and at least one monomethacrylic monomer, provided that the at least one monomethacrylic monomer does not exceed 30% by weight of a total reaction mixture. In another embodiment, the cyclic lactone modified branched acrylic polymer includes caprolactone grafted onto a polymer that is the reaction product of (1) a first acrylate monomer chosen from isobornyl acrylate, butyl acrylate, ethyl hexyl acrylate, cyclohexyl acrylate, and combinations thereof, and (2) a second (meth)acrylate monomer chosen from a hydroxy alkyl (meth)acrylate having has 1-4 carbon atoms in the alkyl group, a di(meth)acrylate monomer, and combinations thereof.

In various embodiments, a portion of the ethylenically unsaturated monomer structures described above also include a hydroxyl group or other group including an active hydrogen capable of reacting with the caprolactone monomer in order to chain extend the cyclic lactone modified branched acrylic polymer with the lactone and also to provide crosslinking functionality to the cyclic lactone modified branched acrylic polymer. Hydroxyl groups are typically utilized. Examples of hydroxyl including monoethylenically unsaturated monomers that can be used to introduce such hydroxyl groups are hydroxyalkyl acrylates and hydroxyalkyl methacrylates such as: 2-hydroxyethyl acrylate, 2-hydroxypropyl acrylate, 3-hydroxypropyl acrylate, 4-hydroxybutyl acrylate, 2-hydroxyethyl methacrylate, 2-hydroxypropyl methacrylate, 3-hydroxypropyl methacrylate, and 4-hydroxybutyl methacrylate. Another example of a hydroxyl functional (meth)acrylate monomer, which is suitable herein, is one which has already been reacted with caprolactone such as TONE M-100, a product of Union Carbide which is the reaction product of one mole of 2-hydroxyethyl acrylate with 2 moles of epsilon-caprolactone. The amount of hydroxyl functionality of the cyclic lactone modified branched acrylic polymer may vary, depending on the final properties desired.

The cyclic lactone modified branched acrylic polymer may include additional functional groups (up to about 65% by weight functional monomers in the monomer mixture) such as amino groups, carbamate groups, alkoxy silane groups such as trimethoxy silane groups, epoxy groups and the like, to impart additional crosslinking functionality to the cyclic lactone modified branched acrylic polymer and enhance the integrity of the cured coating. The amount of functional groups may vary, depending on the final properties desired. These functional groups can be introduced by employing a functional monomer including the desired group in the polymerization process or by post-reaction of a polymer of the invention to introduce the desired additional functionality.

Non-limiting examples of such functional monomers include silane-including monomers, particularly alkoxy silanes such as gamma-acryloxypropyl trimethoxysilane, gamma-methacryloxypropyl trimethoxysilane (Silquest A-174 from Crompton), and gamma-methacryloxypropyl-tris(2-methoxyethoxy) silane. Non-limiting examples of suitable amine-functional monomers include N,N-dimethylaminoethyl methacrylate (tertiary amine), N, N-dimethylaminoethyl acrylate (tertiary amine), N-t-butylaminoethyl methacrylate (secondary amine), N-t-butylaminoethyl acrylate (secondary amine), 2-aminoethyl methacrylate hydrochloride (primary amine), and the like. Non-limiting examples of suitable epoxy functional monomers include glycidyl methacrylate and glycidyl acrylate and any acrylic monomer with a hydroxyl group that can be reacted with epichlorohydrin to produce the epoxy group functional monomers. Non-limiting examples of carbamate functional monomers include adducts of aliphatic alcohols with 2-isocyanatoethyl methacrylate. Typically, a remainder of the ethylenically unsaturated monomers in the monomer mix will be non-functional monomers including no carboxylic acid groups, hydroxyl groups or other reactive or crosslinkable functional groups.

Non-limiting examples of non-functional monoacrylic and methacrylic monomers include alkyl acrylates and methacrylates such as: methyl acrylate, ethyl acrylate, propyl acrylate, isopropyl acrylate, butyl acrylate, isobutyl acrylate, hexyl acrylate, 2-ethylhexyl acrylate, nonyl acrylate, lauryl acrylate, stearyl acrylate, cyclohexyl acrylate, isodecyl acrylate, propyl acrylate, phenyl acrylate, isobornyl acrylate, methyl methacrylate, ethyl methacrylate, butyl methacrylate, t-butyl methacrylate, hexyl methacrylate, 2-ethylhexyl methacrylate, nonyl methacrylate, lauryl methacrylate, stearyl methacrylate, cyclohexyl methacrylate, isodecyl methacrylate, propyl methacrylate, phenyl methacrylate, isobornyl methacrylate and the like, or other constituents such as styrene or substituted styrene, such as methyl styrene, acrylonitrile, and methacrylonitrile, acrylamide, and methacrylamide, and the like.

Non-limiting examples of diacrylic and methacrylic monomers for use as a co-monomer to impart branching include diesters of acrylic and methacrylic acids, such as ethylene glycol dimethacrylate and diacrylate, diethyleneglycol dimethacrylate and diacrylate, triethyleneglycol dimethacrylate and diacrylate, 1,3-propanediol dimethacrylate and diacrylate, 1,4-butanediol diacrylate, 1,6-hexanediol diacrylate, 2,2-dimethylpropanediol diacrylate, tripropylene glycol dimethacrylate and diacrylate, 1,3-butylene glycol dimethacrylate and diacrylate.

Urethane diacrylates and dimethacrylates can also be used, since they impart increased flexibility and reduced brittleness, when used in the correct proportion with the other components. Urethane monomers can be produced by any of the methods known to those skilled in the art. Two typical methods are 1) reacting a diisocyanate with a hydroxy-including acrylate or hydroxy-including methacrylate, such as 2-hydroxyethyl acrylate or 2-hydroxyethyl methacrylate; and 2) reacting an isocyanatoalkyl acrylate or an isocyanatomethacrylate with a suitable diol. Some of the diethylenically unsaturated monomers may also include a functional group, such as any of those listed above, to impart crosslinking functionality to the cyclic lactone modified branched acrylic polymer.

In various embodiments, up to about 70% by weight of the monomer mixture can be at least one bulky monomer chosen from isobornyl (meth)acrylate, butyl (meth)acrylates (all isomers), ethyl hexyl(meth)acrylate (all isomers), cyclohexyl(meth)acrylate, and combinations thereof, typically to increase the intermixing or strike-in resistance of the basecoat composition with overlying layers of a clearcoat composition in a wet-on-wet process.

In still other embodiments, the cyclic lactone modified branched acrylic polymer includes caprolactam grafted onto a polymer that is the reaction product of first acrylate monomer chosen from isobornyl acrylate, butyl acrylate (all isomers), ethyl hexyl acrylate, or cyclohexyl acrylate, or mixture of these monomers, and a second methacrylate or acrylate monomer which is either a hydroxy alkyl methacrylate or acrylate that has 1-4 carbon atoms in the alkyl group, or an acrylic or methacrylic monomer, or mixtures of these monomers, a diacrylate or dimethacrylate monomer or a mixture of these monomers, wherein all or part of the hydroxyl groups are reacted with the caprolactone to form the lactone graft chain on the cyclic lactone modified branched acrylic polymer either prior to, during, or after free-radical polymerization.

In still other embodiments, the cyclic lactone modified branched acrylic polymer is formed from a reaction product wherein the reactants include about 40 to about 98% by weight of the first acrylate, about 1 to about 30% of the second acrylate or methacrylate, and about 1 to about 30% by weight of the diacrylate or dimethacrylate.

In another embodiment, the cyclic lactone modified branched acrylic polymer is formed from a reaction that includes isobornyl acrylate, hydroxy ethyl methacrylate, and 1,6-hexanediol diacrylate, wherein the hydroxyl groups are reacted with caprolactone, typically epsilon-caprolactone, to form the lactone graft on the cyclic lactone modified branched acrylic polymer.

In additional embodiments, other cyclic lactones can also be used. Apart from epsilon-caprolatcone, some non-limiting lactones include gamma-caprolactone; gamma-butyrolactone; gamma-valerolactone; delta-valerolactone; gamma-butyrolactone; and lactones of the corresponding hydroxy carboxylic acids, such as, glycolic acid; lactic acid; 3-hydroxycarboxylic acids, e.g., 3-hydroxypropionic acid, 3-hydroxybutyric acid, 3-hydroxyvaleric acid, and hydroxypyvalic acid.

The cyclic lactone modified branched acrylic polymer can be prepared by a variety of solution polymerization methods in which the monomers are blended with a liquid reaction medium, a free radical polymerization initiator, optionally caprolactone, optionally caprolactone modified monomer, optionally a polymerization catalyst for the caprolactone, and optionally a chain transfer agent, and heated to a temperature of at least about 130° C., at least about 150° C., or at least about 160° C., for a time of about 2 to about 8 hours to form a substantially non-gelled cyclic lactone modified branched acrylic polymer. In general, at temperatures below about 130° C., the amount of internal crosslinking increases and also the relative amount of by-products increases. Furthermore, at too low a reaction temperature, the viscosity of the reaction mixture rapidly increases to a point where the reaction mixture is too viscous to be stirred and the reaction is then difficult to control and must be terminated. When the caprolactone is not included in this process, it can be added to a preformed branched acrylic polymer along with a polymerization catalyst for the caprolactone and heated to a temperature of about 50° C. to about 165° C. for about 2 to about 8 hours to form the cyclic lactone modified branched acrylic polymer.

In further embodiments, a free radical polymerization reaction used to form a backbone of the cyclic lactone modified branched acrylic polymer may be carried out utilizing conventional techniques, such as by heating monomers in the presence of initiators and/or catalysts and varying solvents, with the proviso that the reaction temperature during polymerization must be high enough (i.e., generally above 130° C.) to induce branching without causing the cyclic lactone modified branched acrylic polymer to gel.

While not wishing to be limited by any particular mechanism, it is believed that a high temperature free-radical polymerization process involves so-called "backbiting" which prevents gelation of the monomer mixture. In the polymerization process described above, it is believed that abstraction of a backbone hydrogen occurs to give a tertiary radical which leads to formation of a branching point and ultimately a branched polymer through subsequent monomer addition. Abstraction of the hydrogen from the backbone is believed to occur by intramolecular chain transfer, or backbiting, which accounts for the observed branching, as opposed to formation of a gelled polymer, as would be expected to normally occur in classical free radical polymerization that utilizes greater than insignificant amounts of diacrylate or dimethacrylate monomers.

In some embodiments, even in the presence of diacrylic or dimethacrylic monomers, higher reaction temperatures can favor backbiting, with little or no gelled polymer being formed. This is unexpected because it was previously thought that the presence of large amounts of diacrylic or dimethacrylic monomers in a reaction mixture would cause the reaction mixture to gel. In one embodiment, the process employs high reaction temperatures to increase the incidence of backbone hydrogen abstraction and increase the incidence of branching. Increasing the number of branching points on a polymer chain leads to lower viscosity. The inherent viscosity of branched polymers is lower than for corresponding linear polymers of equal molecular weight, which allows the branched acrylic polymer so formed to be used in a high solids coating with viscosity low enough for practical application such as by spraying.

In other embodiments, the free radical polymerization portion of the process that is used to form the acrylic polymer backbone and branched structure of the cyclic lactone modified branched acrylic polymer is carried out in the presence of a free radical polymerization initiator, typically, tertiary butyl perbenzoate, tertiary butyl peroctoate, cumene hydroperoxide, benzoyl peroxide, di-tertiary butylperoxide, di-cumene peroxide, methyl ethyl ketone peroxide or similar peroxygen compounds, or an azo compound such as azobisisobutyronitrile is employed. The amount of free radical polymerization initiator can be varied depending upon the desired molecular weight but about 0.05-8% by weight based on the weight of total polymerizable monomer is typical. A typical range is from 0.05 to 4 percent by weight. A mixture of two or more initiators may be used.

A solvent is not required to be used but can be used as a liquid reaction medium. The solvent can be used in an amount of from 0 to about 50% of the total reaction mixture. Typically, the solvent is used in an amount of from 30 to 55 percent by weight of the reaction mixture. Any of the conventional polymerization solvents may be utilized in a high temperature process to prepare the cyclic lactone modified branched acrylic polymer. Higher boiling solvents are typically used due to their low vapor pressure at the high temperature required to induce branching. In general, solvents having a boiling point above about 100° C. or about 150° C. are most typical. Non-limiting examples of such higher boiling solvents include esters and mixed ethers and esters, Cellosolve, butyl Cellosolve, Cellosolve acetate, Carbitols, (poly) alkylene glycol dialkyl ethers, and the like. Any solvent may be used so long as the functionality of the solvent does not interfere with the monomer functionality. The reaction may also be run under pressure so that the boiling point of a low boiling solvent can be increased to temperatures desired to produce the cyclic lactone modified branched acrylic polymer.

In addition, various hydrocarbon fractions may be utilized with the most typical being Solvesso 150 or Solvesso 100. Aromatic solvents can also be employed, for example, toluene, xylene, cumene, and ethyl benzene. Special care is exercised when functional solvents are desired. Acid, alcohol and amine functional solvents have the potential of reacting with caprolactone, and therefore should not be introduced until the caprolactone has been reacted with the desired site on the cyclic lactone modified branched acrylic polymer.

Once the monomers capable of reacting with a cyclic lactone or monomers which have been pre-reacted with lactone are included in the reaction mixture, several different processing methods can be used to chain extend the polymer being formed with the cyclic lactone and prepare the final cyclic lactone modified branched acrylic polymer. The main differences involve the specific point where the lactone, typically caprolactone, is introduced into the reaction process.

In one embodiment, a lactone is pre-reacted with the hydroxyl functional ethylenically unsaturated monomer in the presence of a suitable catalyst to form a new lactone extended monomer with an ethylenically unsaturated (typically acrylic or methacrylic) double bond and a pendant hydroxyl group. The molar ratio of lactone to ethylenically unsaturated hydroxyl monomer can be from about 0.1 to about 20 moles, typically 0.25 to 6 moles, most typically 1 to 3 moles. A typical example of such a monomer is TONE M-100 which is a reaction product of one mole of 2-hydroxyethyl acrylate with 2 moles of epsilon-caprolactone.

In another embodiment, the lactone is charged to a reactor along with organic solvents. These materials are heated to a chosen reaction temperature and the ethylenically unsaturated monomers are added along with a free radical catalyst and reacted in the presence of the solvent and the lactone. A catalyst for the lactone polymerization may be added concurrently with the acrylic monomers or may be added prior to the addition of these monomers. The temperature is held for a sufficient time to form the desired cyclic lactone modified branched acrylic polymer.

In still another embodiment, a branched polymer is first formed via a high temperature polymerization process. When this process is complete, the desired lactone is then added along with a catalyst for the lactone polymerization and the desired cyclic lactone modified branched acrylic polymer is formed.

In various embodiments, a molar ratio of lactone to ethylenically unsaturated hydroxyl monomer added to the reaction mixture can vary. The molar ratio is typically from about 0.1 to about 20, more typically from about 0.25 to about 6. Moreover, in various non-limiting embodiments, all values and ranges of values including and between those set forth above are expressly contemplated for use herein.

In addition to a free radical polymerization catalyst, the polymerization medium could include a polymerization catalyst when caprolactone is used in the composition. Typically this caprolactone catalyst may be an alkali or alkaline earth metal alkoxide, e.g. sodium or calcium methoxide; aluminum isopropoxide, organotin compounds, e.g., dibutyl tin dilaurate, dibutyl tin diacetate, stannous octoate, and dibutyl tin oxide tetraalkyl titanates, titanium chelates and acylates, lead salts and lead oxides, zinc borate, antimony oxide, stannous octoate, organic acids, inorganic acids such as sulfuric, hydrochloric, and phosphoric, and Lewis acids such as boron trifluoride. The typical catalyst is dibutyl tin dilaurate.

In any of the processes described above, polymerization is typically continued until the resulting cyclic lactone modified branched acrylic polymer has the desired molecular weight and requisite branching and crosslinking functionality.

In various embodiments, the cyclic lactone modified branched acrylic polymer is the reaction product of caprolactone and at least two ethylenically unsaturated monomers, wherein at least one of the ethylenically unsaturated monomers has the hydroxyl content and the other of the ethylenically unsaturated monomers has no hydroxyl content. For example, the cyclic lactone modified branched acrylic polymer may be the reaction product of caprolactone, at least one monoacrylic monomer, and at least one di(meth)acrylic monomer. Additionally, the cyclic lactone modified branched acrylic polymer may be the reaction product of caprolactone, at least one monoacrylic monomer, at least one di(meth)acrylic monomer, and at least one monomethacrylic monomer, provided that the at least one monomethacrylic monomer does not exceed 30% by weight of a total reaction mixture. Further, the cyclic lactone modified branched acrylic polymer may include caprolactone grafted onto a polymer that is the reaction product of (1) a first acrylate monomer chosen from isobornyl acrylate, butyl acrylate, ethyl hexyl acrylate, cyclohexyl acrylate, and combinations thereof, and (2) a second (meth)acrylate monomer chosen from a hydroxy alkyl (meth)acrylate having has 1-4 carbon atoms in the alkyl group, a (meth)acrylic monomer, a di(meth)acrylate monomer, and combinations thereof. In still other embodiments, the cyclic lactone modified branched acrylic polymer is present in the basecoat composition in an amount from about 15% to about 40%, e.g. about 20% to about 35%, about 25% to about 30%, or about 20% to about 30%, by weight on binder and, e.g. has a weight average molecular weight (Mw) from about 40,000 to about 50,000 g/mol.

In one embodiment, the cyclic lactone modified branched acrylic polymer has a polydispersity of from about 8 to about 15, e.g. about 9 to about 14, about 10 to about 13, about 1 to about 12. In further embodiments, the cyclic lactone modified branched acrylic polymer has a theoretical glass transition temperature (Tg) of from about 60° C. to about 70° C., e.g. about 60, 61, 62, 63, 64, 65, 66, 67, 68, 69 or 70, ° C. In other embodiments, the cyclic lactone modified branched acrylic polymer has a Gardner-Holdt viscosity of from about T to about W, measured at 25° C. Moreover, in various non-limiting embodiments, all values and ranges of values including and between those set forth above are expressly contemplated for use herein. These values are important to give proper dryness to the compositions and layers and to be efficient for strike-in.

Clearcoat Composition:

For forming the clearcoat, a clearcoat composition is used. The clearcoat composition is not particularly restricted and may be a clearcoat composition which includes a film forming resin, a curing agent and the like. The clearcoat composition may be a solvent type, a water-borne type or a powder type. For example, if water-borne, the clearcoat composition may include from about 50 to about 99, about 55 to about 95, about 60 to about 90, about 65 to about 85, about 70 to about 80, or about 75 to about 80, weight percent of water, based on a total weight of the clearcoat composition.

High solids solvent borne clearcoats which have low VOC (volatile organic content) and meet current pollution regulations are typically utilized. Typically suitable solvent borne clearcoat composition include but are not limited to 2 K (two component) systems of polyol polymers crosslinked with isocyanate and 1 K systems of acrylic polyol crosslinked with melamine or 1 K acrylosilane systems in combination with polyol and melamine. Epoxy acid systems can also be used. Such finishes provide automobiles and trucks with a mirror-like exterior finish having an attractive aesthetic appearance, including high gloss and DOI (distinctness of image).

Method of Forming the Multilayer Coating:

The method of forming the multilayer coating includes the steps of providing the substrate including the primer disposed thereon, applying the basecoat composition on the primer, applying the clearcoat composition on the basecoat composition, and curing the basecoat composition and the clearcoat composition to form the multilayer coating on the substrate.

The step of providing the substrate may be any known in the art. The substrate includes the primer disposed thereon. The substrate may be any as described above and may include or be free of the electrodeposition coated film 20 disposed thereon. More specifically, in one embodiment, the method includes the step of applying an electrodeposition coated film 20 to the substrate. Subsequently, the method may include the step of applying the primer coating composition to the substrate. In this case, the substrate may either include the electrodeposition coated film 20 thereon or may be free of the electrodeposition coated film 20.

The primer 14 is not particularly limited in thickness but typically has a thickness of about 0.3 to about 2.5 mils or from about 0.5 to about 1.5 mils. However, this thickness can vary based on the intended use of the primer 14. If the thickness of the primer 14 exceeds about 2.5 mils, image sharpness may deteriorate or a trouble such as unevenness or sagging may occur at the time of application. If the thickness of the primer 14 is less than about 0.3 mils, then the electrodeposition coated film 20 cannot easily be hidden and coating discontinuity may occur, which could expose the electrodeposition coated film 20 to excess UV transmission and degradation. Moreover, in various non-limiting embodiments, all values and ranges of values including and between those set forth above are expressly contemplated for use herein.

Relative to the step of applying the basecoat composition on the primer, this step may be achieved using and method known in the art. For example, the basecoat composition may be applied, like the primer coating composition, using air-electrostatic spray coating or a rotary atomizing electrostatic bell so as to have a dry thickness of 0.4 to 1.2 mils. In the method, the basecoat composition is applied to the primer 14 after the primer coating composition has dried and cured. This is typical in refinish applications. In other words, the basecoat composition is not typically applied to the primer coating composition in a wet-on-wet application. Moreover, in various non-limiting embodiments, all values and ranges of values including and between those set forth above are expressly contemplated for use herein.

Relative to the step of applying the clearcoat composition on the basecoat composition, this is typically completed in a wet-on-wet process. In other words, the wet clearcoat composition is typically applied to the wet basecoat composition before the basecoat composition has completely dried or cured. The clearcoat composition is applied to the basecoat composition for the purpose of smoothing roughness or glittering which occurs due to the presence of luster color pigment and for protecting a surface of the basecoated layer. The clearcoat composition may be applied, like the basecoat composition, using the rotary atomizing electrostatic bells. The clearcoat 18 is typically formed so as to have a dry thickness of about 1.0 to 3.0 mils.

Any steps of applying described herein are not particularly limited and may be completed using any method in the art. For example, conventional coating methods such as spraying, electrostatic spraying, high speed rotational electrostatic bells, and the like, can be utilized. In various embodiments, air atomized spraying with or without electrostatic enhancement, and high speed rotary atomizing electrostatic bells, are utilized since these techniques are typically employed in modern automobile and truck assembly plants.

Relative to the step of curing the basecoat composition and the clearcoat composition to form the multilayer coating on the substrate, both compositions are typically cured at the same time. However, one of the compositions may be cured or partially cured independent from the other composition. The method of curing is not particularly limited and may include baking at a particular temperature as determined by one of skill in the art. For example, the curing may occur at room temperature or in a curing oven at a curing temperature of from about 50° C. to about 180° C., or from about 130° C. to about 160° C., so as to obtain a multilayer coating. The curing time may vary depending on the curing temperature. However, a curing time of about 10 to about 30 minutes is typically adequate when the curing temperature is from about 130° C. to about 160° C. Moreover, in various non-limiting embodiments, all values and ranges of values including and between those set forth above are expressly contemplated for use herein.

This disclosure also provides an article 22 that includes the substrate 12, the electrodeposition coated film 20 disposed on the substrate 12, and the multilayer coating 10 disposed on the substrate 12. The multilayer coating 10 includes the primer 14, the basecoat 16 disposed on the primer 14, and the clearcoat 18 disposed on the basecoat 16. The basecoat 16 is formed from the basecoat composition. The disclosure also provides a method of forming the article 22. The method can include one or more of the aforementioned steps of forming the multilayer coating 10.

EXAMPLES

Differences in Ln values both before and after applying a clearcoat is used to characterize anti-strike-in in the Examples below. The smaller the difference, the better anti-strike-in property is determined to be. An average of three measurements is reported.

M15, M45 and M60 are mottling values measured at 15, 45 and 60 degrees from specular reflection, respectively, by a Cloud-runner (BYK-Gardner GmbH Co.). They are used to characterize the mottling of a coating in these examples. An average of 20 measurements is reported below for mottling. The smaller the value, the less mottling the coating exhibits. Short wave (SW) is measured by a wavescan (BYK-Gardner GmbH Co.) and used to characterize the smoothness of the coating. The lower the value, the smoother the coating is determined to be. An average of three measurements is reported.

Example 1

All silver paint samples have a ready-to-spray volume solid of 16 vol % and 24.6 percentage of aluminum to total binder. Each sample has 6 wt % of wax over total binder and 10 wt % of total Cellulose Acetate Butyrate (CAB, from Eastman Chemical Co.) (7.5 wt % of CAB-381-20 and 2.5 wt % of CAB-531-1) over total binder. As is known in the art, the CAB-381-20 has a lower butyrate content than the CAB-531-1.

Two CAB solutions are made by dissolving a CAB powder into a mixture of 50/50 weight ratio of butyl acetate and methyl ethyl ketone. One CAB solution includes 15 wt % of CAB-381-20 and the second CAB solution includes 20 wt % of CAB-531-1. An aluminum pigment is utilized which is a SSP-353 aluminum paste from Silberline Manufacturing Co.

To prepare a basecoat sample, a wax dispersion (6 wt % of AC® 405T ethylene vinyl acetate copolymer in a mixture of xylene and butyl acetate at a weight ratio of 40/54), solvent, and resin are added to a metal container and mixed well using an air mixer. The resins are labeled HBA, PE, and Acrylic-1. The aluminum paste is slowly added to the container and mixed for 30 minutes. CAB solutions are then added in sequence to the container and mixed for another 15 minutes.

Commercial Centari 6000 paint (from Axalta Coating Systems) is used as a control. All samples are sprayed by an EcoPainter machine. Commercial sealer 42440s (from Axalta Coating Systems) is first applied on a 12×18 inch UNP coil-coated aluminum panel (from ACT Test Panels LLC) according to the Technical Data Sheet (TDS). The basecoat is sprayed using a Satajet 4000 RP spray gun with a 1.3 mm tip (from Sata German Engineering Co.). After the basecoat is flashed, a commercial clearcoat 8035 (from Axalta Coating Systems) is applied. The full system is then baked at 140° F. for 30 mins. After formation, strike-in, mottling, and surface smoothness are determined.

TABLE 1

| Sample | Wt % to total binder | | | Mottling Values | | | Strike-in Values | Smoothness Values |
|---|---|---|---|---|---|---|---|---|
| | HBA | PE | Acrylic-1 | M15 | M45 | M60 | Ln(CC)-Ln(BC) | SW_SD |
| Control | 0 | 0 | 0 | 3.5 | 4.0 | 4.5 | −5.4 | 14.8 |
| S1 | 0 | 0 | 83.5 | 3.4 | 4.2 | 4.5 | −4.1 | 13.8 |
| S2 | 0 | 25 | 58.8 | 3.6 | 4.6 | 4.8 | −4.9 | 12.9 |
| S3 | 12.5 | 0 | 71.0 | 3.3 | 4.3 | 4.4 | −3.5 | 11.6 |
| S4 | 25 | 0 | 58.5 | 3.1 | 3.8 | 4.3 | −2.7 | 11.7 |
| S5 | 50 | 0 | 33.5 | 3.5 | 4.3 | 4.9 | −3.5 | 11.7 |
| S6 | 75 | 0 | 8.5 | 4.5 | 5.4 | 5.5 | −5.5 | 12.1 |

HBA is a hyperbranched acrylic polymer formed using the following procedure. To a 12-liter glass flask equipped with an agitator, thermometer, water condenser, nitrogen inlet and heating mantle is added 1758.6 gms. Solvesso 100. This mixture is agitated and heated to reflux. While maintaining the batch at reflux, a mixture of 703.4 gms. 1,6-hexanediol diacrylate, 3033.6 gms. Isobornyl acrylate, 659.5 gms, hydroxyethyl methacrylate, 44 gms t-butylperoxy acetate, 703.4 gms Solvesso 100 is added over a 300 minute period. Then the reaction mixture is held at reflux for an additional 60 minutes. After the hold period, the reaction mixture is cooled to 120° C. A mixture of 885.3 gms gamma-caprolactone, 412.2 gms Solvesso 100 and 3.0 gms dibutyl tin dilaurate is added to the flask over a 30 minute period. After addition is completed the reaction temperature is raised to 150° C. and held for an additional 3 hours. The weight solids of the resulting polymer solution is 65.8% and the Gardner-Holdt viscosity measured at 25° C. is "X." The weight average molecular weight of the polymer was 54,500 and polydispersity is 11, each as determined by GPC.

PE is branched polyester having a weight average molecular weight of about 9,900 and Tg of −30° C. The resin solution is 80 wt % solid in n-butyl alcohol.

Acrylic-1 is a random acrylic copolymer having a weight average molecular weight of about 13,000 and Tg of around 24° C. It is 62 wt % solids in n-butyl acetate.

Mottling values, Strike in values, and Smoothness values are determined using procedures as previously described. Relative to mottling values, lower numbers represent reduced mottling. Relative to strike in values, values closer to zero represent reduced strike-in with zero being optimum. Relative to smoothness values, lower values represent improved smoothness.

Table 1 clearly shows Si has very comparable appearance (mottling values) to the control and slightly improved smoothness and anti-strike-in properties. Replacing acrylic resin 1 with a polyester resin led to worse mottling and more strike-in even though it led to a smoother finish. However, replacing acrylic resin 1 with certain amount of HBA is very effective to reduce strike-in and mottling while achieving a smoother film.

In various embodiments, any and all combinations of the aforementioned components are hereby expressly contemplated even if not described together in a single paragraph or section. While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration in any way. Rather, the foregoing detailed description will provide those skilled in the art with a convenient road map for implementing an exemplary embodiment. It being understood that various changes may be made in the function and arrangement of elements described in an exemplary embodiment without departing from the scope as set forth in the appended claims.

What is claimed is:

1. A three coat two bake method of forming a multilayer coating on a substrate which exhibits reduced strike-in and mottling, said method comprising the steps of:
   A. providing the substrate comprising a solvent-borne primer disposed thereon and subsequently baking the primer to cure;
   B. applying a solvent-borne basecoat composition directly on the cured primer, wherein the basecoat composition comprises a film forming resin, a pigment, and about 12.5% to 50% by weight on binder of a cyclic lactone modified branched acrylic polymer having a hydroxyl monomer content of about 1% to about 65% by weight, all or part of which has been reacted with a cyclic lactone, and having a weight average molecular weight (Mw) of about 10,000 to about 150,000 g/mol.;
   C. applying a solvent-borne clearcoat composition directly on the basecoat composition in a wet on wet process, and subsequently
   D. simultaneously curing the basecoat composition and the clearcoat composition by baking to form a basecoat and a clearcoat, respectively, and to form the multilayer coating on the substrate;
   wherein the multilayer coating exhibits mottling of less than about 4 measured at 15 degrees from specular reflection,
   wherein the primer is free of the cyclic lactone modified branched acrylic polymer;
   wherein the primer, the basecoat composition, and the clearcoat composition are each free of a cyclic lactone modified linear acrylic polymer; and
   wherein the basecoat composition is free of a branched polyester.

2. The method of claim 1 wherein the multilayer coating exhibits a strike-in of less than about 3.5 measured as a difference in Ln values.

3. The method of claim 2 wherein the cyclic lactone modified branched acrylic polymer is the reaction product of caprolactone, at least one monoacrylic monomer, and at least one di(meth)acrylic monomer.

4. The method of claim 2 wherein the cyclic lactone modified branched acrylic polymer is the reaction product of caprolactone, at least one monoacrylic monomer, at least one di(meth)acrylic monomer, and at least one monomethacrylic monomer, provided that the at least one monomethacrylic monomer does not exceed 30% by weight of a total reaction mixture.

5. The method of claim 2 wherein the cyclic lactone modified branched acrylic polymer comprises caprolactone grafted onto a polymer that is the reaction product of (1) a first acrylate monomer chosen from isobornyl acrylate, butyl acrylate, ethyl hexyl acrylate, cyclohexyl acrylate, and combinations thereof, and (2) a second (meth)acrylate monomer chosen from a hydroxy alkyl (meth)acrylate having 1-4 carbon atoms in the alkyl group, a (meth)acrylic monomer, a di(meth)acrylate monomer, and combinations thereof.

6. The method of claim 1 wherein the cyclic lactone modified branched acrylic polymer is the reaction product of caprolactone and at least two ethylenically unsaturated monomers, wherein at least one of the ethylenically unsaturated monomers has the hydroxyl content and the other of the ethylenically unsaturated monomers has no hydroxyl content.

7. The method of claim 1 wherein the cyclic lactone modified branched acrylic polymer is present in the basecoat composition in an amount from about 15% to about 40% by weight on binder.

8. The method of claim 1 wherein the weight average molecular weight (Mw) of the cyclic lactone modified branched acrylic polymer is from about 40,000 to about 50,000 g/mol.

9. The method of claim 1 wherein the cyclic lactone modified branched acrylic polymer has a polydispersity of from about 8 to about 15.

10. The method of claim 1 wherein the cyclic lactone modified branched acrylic polymer has a theoretical glass transition temperature (Tg) of from about 60° C. to about 70° C.

11. The method of claim 1 wherein the basecoat composition comprises a curing agent.

12. The method of claim 1 wherein an electrodeposition coated film is disposed on and in direct contact with the substrate, and the cured primer is disposed on and in direct contact with the electrodeposition coated film.

13. The method of claim 1, wherein:
the step (B) comprises depositing the solvent-borne basecoat composition in two or more passes on the cured primer; and/or
the step (C) comprises depositing the solvent-borne clearcoat composition in two or more passes on the basecoat composition.

14. The method of claim 1 wherein the cyclic lactone modified branched acrylic polymer is the reaction product of:
(1) the reaction product of 1,6-hexanediol diacrylate; isobornyl acrylate; and
hydroxyethyl methacrylate; in the presence of t-butylperoxy acetate; and
(2) gamma-caprolactone.

15. The method of claim 14 wherein the film forming resin is an acrylic copolymer.

16. The method of claim 1 wherein the film forming resin is an acrylic copolymer.

17. The method of claim 1 wherein the multi-layer coating exhibits a strike-in of less than about 3.5 measured as a difference in Ln values and wherein the cyclic lactone modified branched acrylic polymer is the reaction product of caprolactone and at least two ethylenically unsaturated monomers, wherein at least one of the ethylenically unsaturated monomers has the hydroxyl content and the other of the ethylenically unsaturated monomers has no hydroxyl content.

18. A three coat two bake method of forming a multilayer coating on a substrate which exhibits reduced strike-in and mottling, said method comprising the steps of:
A providing the substrate comprising a solvent-borne primer disposed thereon and subsequently baking the primer to cure;
B. applying a solvent-borne basecoat composition directly on the cured primer, wherein the basecoat composition comprises a film forming resin, a pigment, and about 12.5% to about 50% by weight on binder of a cyclic lactone modified branched acrylic polymer having a hydroxyl monomer content of about 1% to about 65% by weight, and a weight average molecular weight (Mw) of about 10,000 to about 150,000 g/mol and that is a reaction product of:
(1) the reaction product of 1,6-hexanediol diacrylate; isobornyl acrylate; and
hydroxyethyl methacrylate; in the presence of t-butylperoxy acetate; and
(2) gamma-caprolactone;
C. applying a solvent-borne clearcoat composition directly on the basecoat composition in a wet on wet process, and subsequently
D. simultaneously curing the basecoat composition and the clearcoat composition by baking to form a basecoat and a clearcoat, respectively, and to form the multilayer coating on the substrate;
wherein the multilayer coating exhibits mottling of less than or equal to about 3.5 measured at 15 degrees from specular reflection,
wherein the primer is free of the cyclic lactone modified branched acrylic polymer;
wherein the primer, the basecoat composition, and the clearcoat composition are each free of a cyclic lactone modified linear acrylic polymer; and
wherein the basecoat composition is free of a branched polyester.

19. The method of claim 18 wherein the multilayer coating exhibits a smoothness of about 11.6 to about 11.7, a mottling of about 3.1 to about 3.5, and a strike-in of about 2.7 to about 3.5.

* * * * *